(12) United States Patent
Xu et al.

(10) Patent No.: US 9,654,683 B2
(45) Date of Patent: May 16, 2017

(54) APPARATUS AND METHOD FOR IMAGE ACQUISITION

(71) Applicant: Huawei Technologies Co., Ltd., Shenzhen, Guangdong (CN)

(72) Inventors: Jing Xu, Shenzhen (CN); Cong Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 14/831,628

(22) Filed: Aug. 20, 2015

(65) Prior Publication Data

US 2015/0358531 A1 Dec. 10, 2015

Related U.S. Application Data

(63) Continuation of application No. PCT/CN2014/075463, filed on Apr. 16, 2014.

(30) Foreign Application Priority Data

Oct. 29, 2013 (CN) .......................... 2013 1 0519940

(51) Int. Cl.
*H04N 5/232* (2006.01)
*G02B 3/00* (2006.01)
(Continued)

(52) U.S. Cl.
CPC ....... *H04N 5/23212* (2013.01); *G02B 3/0006* (2013.01); *G02B 3/0081* (2013.01);
(Continued)

(58) Field of Classification Search
CPC ........... H04N 5/23212; H04N 5/23245; H04N 5/232; H04N 5/2254; H04N 5/23296;
(Continued)

(56) References Cited

U.S. PATENT DOCUMENTS 6,081,670 A 6/2000 Madsen et al.
6,898,021 B1 * 5/2005 Tang ........................ G02B 3/14
349/200

(Continued)

FOREIGN PATENT DOCUMENTS

CN 1898947 A 1/2007
CN 101330574 A 12/2008
(Continued)

*Primary Examiner* — Michael Osinski

(57) ABSTRACT

The present invention discloses an apparatus and a method for image acquisition. The apparatus includes: a main lens, a micro lens array, an image sensor, and a focal length control unit; the main lens, the micro lens array, and the image sensor are successively disposed alternately, and the image sensor is configured to: sense an optical signal that is transmitted from the main lens and the micro lens array, and convert the optical signal into an electrical signal; and the focal length control unit is configured to control a focal length of the main lens, a focal length of a micro lens in the micro lens array, or focal lengths of the main lens and the micro lens. The apparatus and the method for image acquisition according to embodiments of the present invention can implement switching between the two light field camera modes, thereby improving user experience.

20 Claims, 8 Drawing Sheets

(51) Int. Cl.
  *G02B 7/02* (2006.01)
  *G02B 7/10* (2006.01)
  *H04N 5/225* (2006.01)
  *H04N 13/02* (2006.01)
  *G02B 27/00* (2006.01)

(52) U.S. Cl.
  CPC ............ *G02B 7/021* (2013.01); *G02B 7/102* (2013.01); *G02B 27/0075* (2013.01); *H04N 5/2254* (2013.01); *H04N 5/232* (2013.01); *H04N 5/23245* (2013.01); *H04N 13/0232* (2013.01)

(58) Field of Classification Search
  CPC .... H04N 5/2253; H04N 5/23229; G02B 3/14; G02B 3/0081; G02B 3/0006; G02B 7/021; G02B 7/102; G02B 27/0075
  See application file for complete search history.

(56) References Cited

U.S. PATENT DOCUMENTS

| | | | | |
|---|---|---|---|---|
| 7,259,917 | B2* | 8/2007 | Hillis | G06T 5/50 348/349 |
| 7,949,252 | B1 | 5/2011 | Georgiev | |
| 8,189,089 | B1 | 5/2012 | Georgiev et al. | |
| 8,305,429 | B2* | 11/2012 | Kajihara | G03B 15/00 348/340 |
| 8,675,114 | B2* | 3/2014 | Watanabe | G03B 17/58 348/218.1 |
| 8,836,844 | B2* | 9/2014 | Hiasa | G02B 7/346 348/340 |
| 8,947,578 | B2* | 2/2015 | Park | H04N 5/23212 348/340 |
| 2005/0225877 | A1* | 10/2005 | Tang | G02B 3/0012 359/721 |
| 2007/0085915 | A1 | 4/2007 | Ootsuna et al. | |
| 2008/0165270 | A1* | 7/2008 | Watanabe | G03B 17/58 348/340 |
| 2008/0309813 | A1 | 12/2008 | Watanabe | |
| 2010/0026852 | A1* | 2/2010 | Ng | G02B 3/0056 348/239 |
| 2010/0066812 | A1 | 3/2010 | Kajihara et al. | |
| 2010/0085468 | A1* | 4/2010 | Park | H04N 5/23296 348/345 |
| 2010/0141802 | A1 | 6/2010 | Knight et al. | |
| 2012/0127351 | A1* | 5/2012 | Vlutters | G01J 3/02 348/266 |
| 2013/0033626 | A1 | 2/2013 | Ng et al. | |
| 2013/0076930 | A1 | 3/2013 | Border et al. | |
| 2013/0076966 | A1 | 3/2013 | Border et al. | |
| 2013/0182170 | A1* | 7/2013 | Suzuki | H04N 5/361 348/340 |
| 2013/0216199 | A1 | 8/2013 | Nakajima | |
| 2013/0222555 | A1 | 8/2013 | Nagasaka et al. | |
| 2013/0250159 | A1* | 9/2013 | Nagasaka | H04N 5/2254 348/340 |
| 2013/0265485 | A1 | 10/2013 | Kang | |
| 2014/0098212 | A1* | 4/2014 | Yamanaka | H04N 5/30 348/79 |
| 2014/0233001 | A1* | 8/2014 | Choi | G03F 7/70208 355/55 |
| 2014/0320729 | A1* | 10/2014 | Lee | H04N 5/2254 348/345 |
| 2015/0256801 | A1* | 9/2015 | Yamanaka | H04N 5/2254 348/270 |
| 2016/0191766 | A1* | 6/2016 | Cui | H04N 5/2254 348/340 |

FOREIGN PATENT DOCUMENTS

| | | |
|---|---|---|
| CN | 101554042 A | 10/2009 |
| CN | 102739945 A | 10/2012 |
| CN | 203219391 U | 9/2013 |
| EP | 2 104 334 A1 | 9/2009 |

* cited by examiner

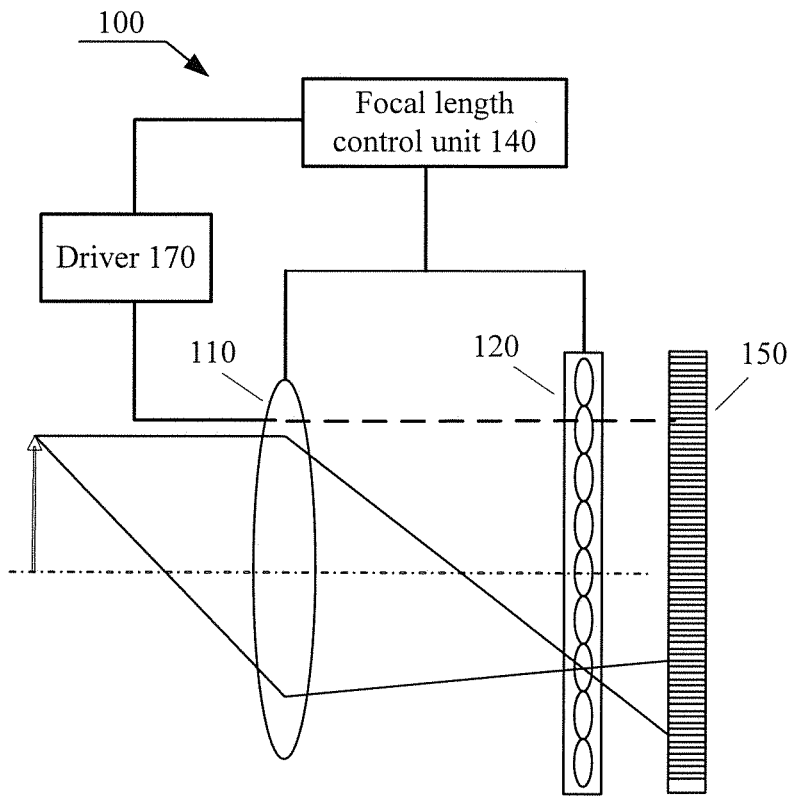

| A focal length control unit controls a focal length of a main lens, a focal length of a micro lens in a micro lens array, or focal lengths of the main lens and the micro lens, so that the apparatus is switched between a first light field camera mode and a second light field camera mode | ~ S810 |

↓

| An image sensor senses an optical signal that is transmitted from the main lens and the micro lens array, and converts the optical signal into an electrical signal, to acquire an image | ~ S820 |

FIG. 8

APPARATUS AND METHOD FOR IMAGE ACQUISITION

CROSS-REFERENCE TO RELATED APPLICATION

This application is a continuation of International Application No. PCT/CN2014/075463, filed on Apr. 16, 2014, which claims priority to Chinese Patent Application No. 201310519940.7, filed on Oct. 29, 2013, both of which are hereby incorporated by reference in their entireties.

TECHNICAL FIELD

The present invention relates to the field of information technologies, and more specifically, to an apparatus and a method for image acquisition.

BACKGROUND

Compared with a common camera, a light field camera has advantages such as focusing after photographing, and being capable of displaying an image in a three-dimensional manner. A basic structure of the light field camera is that a micro lens array is added between a main lens and a sensor of the common camera. In alight field camera 1.0 proposed by Stanford University, the micro lens array is located on an image plane of the main lens and forms an image on a main side of the main lens, and an image sensor is located on a focal plane of the micro lens array; an imaging resolution of the light field camera 1.0 is not ideal enough. In a light field camera 2.0 proposed by Todor, that is, in a focusing light field camera, the micro lens array is located in front of or behind a focal plane of the main lens and forms an image on the focal plane of the main lens, and the image sensor is located in front of or behind the focal plane of the micro lens array. Compared with the light field camera 1.0, an imaging resolution of the light field camera 2.0 has a relatively high spatial resolution, but an angular resolution of the light field camera 2.0 is relatively low. Because the two light field cameras each have an advantage and a disadvantage, switching between two light field camera modes is needed to satisfy a requirement of a user.

SUMMARY

Embodiments of the present invention provide an apparatus and a method for image acquisition, which can implement switching between two light field camera modes.

According to a first aspect, an apparatus for image acquisition is provided, including: a main lens, a micro lens array, an image sensor, and a focal length control unit, where the main lens, the micro lens array, and the image sensor are successively disposed alternately, and the image sensor is configured to: sense an optical signal that is transmitted from the main lens and the micro lens array, and convert the optical signal into an electrical signal; and the focal length control unit is configured to control a focal length of the main lens, a focal length of a micro lens in the micro lens array, or focal lengths of the main lens and the micro lens, so that the apparatus is switched between a first light field camera mode and a second light field camera mode.

In a first possible implementation manner, the focal length control unit is a voltage-controlled focal length control unit, the main lens and the micro lens are voltage-controlled zoom lenses, and the focal length control unit changes the focal lengths of the main lens and the micro lens by controlling voltages imposed on the main lens and the micro lens array.

With reference to the first possible implementation manner of the first aspect, in a second possible implementation manner, a distance a between the micro lens array and the image sensor and a distance b between the micro lens array and the main lens satisfy an equation $b/d_1=a/d_2$, where $d_1$ is an aperture of the main lens, and $d_2$ is an aperture of the micro lens.

With reference to the second possible implementation manner of the first aspect, in a third possible implementation manner, the focal length control unit is configured to: control the voltage imposed on the micro lens array, so that the focal length $f_2$ of the micro lens is equal to the distance a between the micro lens array and the image sensor, and control the voltage imposed on the main lens, so that the focal length $f_1$ of the main lens is equal to the distance b between the main lens and the micro lens array, so that the apparatus is in the first light field camera mode.

With reference to the second or the third possible implementation manner of the first aspect, in a fourth possible implementation manner, the focal length control unit is configured to: control the voltage imposed on the main lens, so that the focal length $f_1$ of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2},$$

and control the voltage imposed on the micro lens array, so that the focal length $f_2$ of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode.

With reference to the first possible implementation manner of the first aspect, in a fifth possible implementation manner, the apparatus further includes: a driver, where the driver is directly or indirectly connected to the main lens or to the micro lens array and the image sensor, and is configured to drive the main lens, or drive the micro lens array and the image sensor, to adjust a distance between the main lens and the micro lens array.

With reference to the fifth possible implementation manner of the first aspect, in a sixth possible implementation manner, the focal length control unit is configured to: control the voltage imposed on the micro lens array, so that the focal length $f_2$ of the micro lens is equal to a distance a between the micro lens array and the image sensor, and control the voltage imposed on the main lens, so that the focal length $f_1$ of the main lens satisfies an equation $f_1/d_1=f_2/d_2$; and the driver is configured to: drive the main lens, or drive the micro lens array and the image sensor, so that the distance b between the main lens and the micro lens array is equal to the focal length $f_1$ of the main lens, so that the apparatus is in the first light field camera mode, where $d_1$ is an aperture of the main lens, and $d_2$ is an aperture of the micro lens.

With reference to the fifth possible implementation manner of the first aspect, in a seventh possible implementation manner, the focal length control unit is configured to: control the voltage imposed on the main lens, so that the focal length $f_1$ of the main lens satisfies an equation $$f_1 = \frac{(d_1a + d_2a + d_2b) \pm \sqrt{(d_1a + d_2a + d_2b)^2 - 4d_1d_2ab}}{2d_2},$$

and control the voltage imposed on the micro lens array, so that the focal length $f_2$ of the micro lens satisfies an equation $$f_2 = \frac{(d_1a + d_2a + d_2b) \pm \sqrt{(d_1a + d_2a + d_2b)^2 - 4d_1d_2ab}}{2d_1},$$

so that the apparatus is in the second light field camera mode, where a is a distance between the micro lens array and the image sensor, b is the distance between the main lens and the micro lens array, $d_1$ is an aperture of the main lens, and $d_2$ is an aperture of the micro lens.

With reference to the sixth possible implementation manner of the first aspect, in an eighth possible implementation manner, the driver is configured to: drive the main lens, or drive the micro lens array and the image sensor, to change the distance b between the main lens and the micro lens array; and the focal length control unit is configured to: control the voltage imposed on the main lens, so that the focal length $f_1$ of the main lens satisfies an equation $$f_1 = \frac{(d_1a + d_2a + d_2b) \pm \sqrt{(d_1a + d_2a + d_2b)^2 - 4d_1d_2ab}}{2d_2},$$

and control the voltage imposed on the micro lens array, so that the focal length $f_2$ of the micro lens satisfies an equation $$f_2 = \frac{(d_1a + d_2a + d_2b) \pm \sqrt{(d_1a + d_2a + d_2b)^2 - 4d_1d_2ab}}{2d_1},$$

so that the apparatus is in the second light field camera mode.

With reference to any one of the first to the eighth possible implementation manners of the first aspect, in a ninth possible implementation manner, the focal length control unit is configured to: control the voltage that is imposed on the micro lens array to be zero, so that the focal length of the micro lens is infinite, and control the voltage imposed on the main lens, to adjust the focal length of the main lens, so that the optical signal focuses on the image sensor, so that the apparatus is in a common camera mode.

According to a second aspect, a method for image acquisition by an apparatus for image acquisition is provided, where the apparatus includes a main lens, a micro lens array, a focal length control unit, and an image sensor, where the main lens, the micro lens array, and the image sensor are successively disposed alternately; and the method includes: controlling, by the focal length control unit, a focal length of the main lens, a focal length of a micro lens in the micro lens array, or focal lengths of the main lens and the micro lens, so that the apparatus is switched between a first light field camera mode and a second light field camera mode; and sensing, by the image sensor, an optical signal that is transmitted from the main lens and the micro lens array, and converting the optical signal into an electrical signal, to acquire an image.

In a first possible implementation manner, the focal length control unit is a voltage-controlled focal length control unit, and the main lens and the micro lens are voltage-controlled zoom lenses; and the controlling, by the focal length control unit, a focal length of the main lens, a focal length of a micro lens in the micro lens array, or focal lengths of the main lens and the micro lens includes: controlling, by the focal length control unit, a voltage imposed on the main lens, a voltage imposed on the micro lens array, or voltages imposed on the main lens and the micro lens array, to control the focal length of the main lens, the focal length of the micro lens, or the focal lengths of the main lens and the micro lens.

With reference to the first possible implementation manner of the second aspect, in a second possible implementation manner, a distance a between the micro lens array and the image sensor and a distance b between the micro lens array and the main lens satisfy an equation $b/d_1=a/d_2$, where $d_1$ is an aperture of the main lens, and $d_2$ is an aperture of the micro lens.

With reference to the second possible implementation manner of the second aspect, in a third possible implementation manner, the controlling, by the focal length control unit, a focal length of the main lens, a focal length of a micro lens in the micro lens array, or focal lengths of the main lens and the micro lens includes: controlling, by the focal length control unit, the voltage imposed on the micro lens array, so that the focal length $f_2$ of the micro lens is equal to the distance a between the micro lens array and the image sensor; and controlling, by the focal length control unit, the voltage imposed on the main lens, so that the focal length $f_1$ of the main lens is equal to the distance b between the main lens and the micro lens array, so that the apparatus is in the first light field camera mode.

With reference to the second or the third possible implementation manner of the second aspect, in a fourth possible implementation manner, the controlling, by the focal length control unit, a focal length of the main lens, a focal length of a micro lens in the micro lens array, or focal lengths of the main lens and the micro lens includes: controlling, by the focal length control unit, the voltage imposed on the main lens, so that the focal length $f_1$ of the main lens satisfies an equation $$f_1 = \frac{(d_1a + d_2a + d_2b) \pm \sqrt{(d_1a + d_2a + d_2b)^2 - 4d_1d_2ab}}{2d_2};$$

and controlling, by the focal length control unit, the voltage imposed on the micro lens array, so that the focal length $f_2$ of the micro lens satisfies an equation $$f_2 = \frac{(d_1a + d_2a + d_2b) \pm \sqrt{(d_1a + d_2a + d_2b)^2 - 4d_1d_2ab}}{2d_1},$$

so that the apparatus is in the second light field camera mode.

With reference to the first possible implementation manner of the second aspect, in a fifth possible implementation manner, the apparatus further includes a driver, where the driver is directly or indirectly connected to the main lens or to the micro lens array and the image sensor; and the method further includes: driving, by the driver, the main lens, or driving the micro lens array and the image sensor, to adjust a distance between the main lens and the micro lens array.

With reference to the fifth possible implementation manner of the second aspect, in a sixth possible implementation manner, the controlling, by the focal length control unit, a focal length of the main lens, a focal length of a micro lens in the micro lens array, or focal lengths of the main lens and the micro lens includes: controlling, by the focal length control unit, the voltage imposed on the micro lens array, so that the focal length $f_2$ of the micro lens is equal to a distance a between the micro lens array and the image sensor; controlling, by the focal length control unit, the voltage imposed on the main lens, so that the focal length $f_1$ of the main lens satisfies an equation $f_1/d_1 = f_2/d_2$, where $d_1$ is an aperture of the main lens, and $d_2$ is an aperture of the micro lens; and the driving, by the driver, the main lens, or driving the micro lens array and the image sensor includes: driving, by the driver, the main lens, or driving the micro lens array and the image sensor, so that the distance b between the main lens and the micro lens array is equal to the focal length $f_1$ of the main lens, so that the apparatus is in the first light field camera mode.

With reference to the fifth possible implementation manner of the second aspect, in a seventh possible implementation manner, the controlling, by the focal length control unit, a focal length of the main lens, a focal length of a micro lens in the micro lens array, or focal lengths of the main lens and the micro lens includes: controlling, by the focal length control unit, the voltage imposed on the main lens, so that the focal length $f_1$ of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2};$$

and controlling, by the focal length control unit, the voltage imposed on the micro lens array, so that the focal length $f_2$ of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode, where a is a distance between the micro lens array and the image sensor, b is the distance between the main lens and the micro lens array, $d_1$ is an aperture of the main lens, and $d_2$ is an aperture of the micro lens.

With reference to the sixth possible implementation manner of the second aspect, in an eighth possible implementation manner, the driving, by the driver, the main lens, or driving the micro lens array and the image sensor further includes: driving, by the driver, the main lens, or driving the micro lens array and the image sensor, to change the distance b between the main lens and the micro lens array; and the controlling, by the focal length control unit, a focal length of the main lens, a focal length of a micro lens in the micro lens array, or focal lengths of the main lens and the micro lens further includes: controlling, by the focal length control unit, the voltage imposed on the main lens, so that the focal length $f_1$ of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2};$$

and controlling, by the focal length control unit, the voltage imposed on the micro lens array, so that the focal length $f_2$ of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode.

With reference to any one of the first to the eighth possible implementation manners of the second aspect, in a ninth possible implementation manner, the controlling, by the focal length control unit, a focal length of the main lens, a focal length of a micro lens in the micro lens array, or focal lengths of the main lens and the micro lens includes: controlling, by the focal length control unit, the voltage that is imposed on the micro lens array to be zero, so that the focal length of the micro lens is infinite; and controlling, by the focal length control unit, the voltage imposed on the main lens, to adjust the focal length of the main lens, so that the optical signal focuses on the image sensor, so that the apparatus is in a common camera mode.

Based on the foregoing technical solutions, by controlling a focal length of a main lens, a focal length of a micro lens in a micro lens array, or focal lengths of the main lens and the micro lens, the apparatus and the method for image acquisition according to the embodiments of the present invention enable the apparatus to be switched between a first light field camera mode and a second light field camera mode, which can implement switching between the two light field camera modes, thereby improving user experience.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 7 is a schematic structural diagram of an apparatus for image acquisition according to still another embodiment of the present invention;

FIG. 8 is a schematic flowchart of a method for image acquisition according to an embodiment of the present invention;

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In an embodiment of the present invention, an apparatus for image acquisition may be an apparatus that has a function of photographing, such as a camera, a mobile phone, or a tablet computer.

Figure 1:
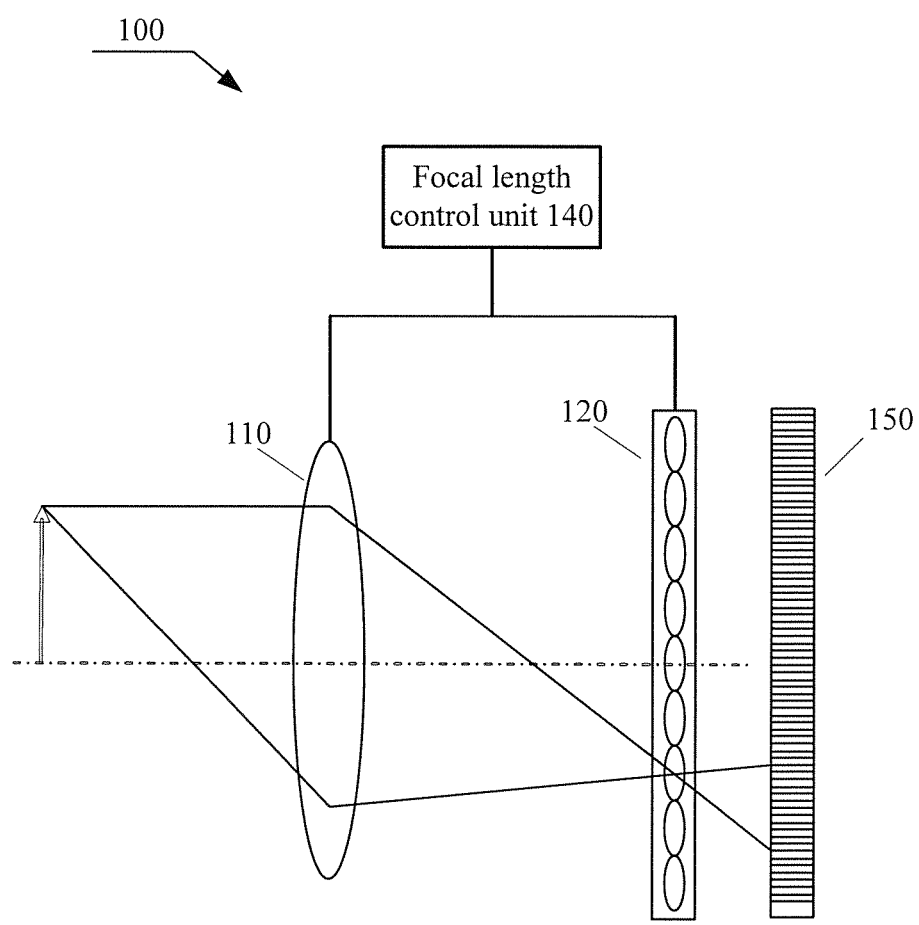
FIG. 1 is a schematic structural diagram of an apparatus for image acquisition according to an embodiment of the present invention.

FIG. 1 shows a schematic structural diagram of an apparatus 100 for image acquisition according to an embodiment of the present invention. As shown in FIG. 1, the apparatus 100 includes: a main lens 110, a micro lens array 120, an image sensor 150, and a focal length control unit 140.

The main lens 110, the micro lens array 120, and the image sensor 150 are successively disposed alternately.

The image sensor 150 is configured to: sense an optical signal that is transmitted from the main lens 110 and the micro lens array 120, and convert the optical signal into an electrical signal.

The focal length control unit 140 is configured to control a focal length of the main lens 110, a focal length of a micro lens in the micro lens array 120, or focal lengths of the main lens 110 and the micro lens, so that the apparatus 100 is switched between a first light field camera mode and a second light field camera mode.

In this embodiment of the present invention, the focal length of the main lens 110 and the focal length of the micro lens in the micro lens array 120 may be both changed under control of the focal length control unit 140. In this way, by controlling the focal length of the main lens 110, the focal length of the micro lens, or the focal lengths of the main lens 110 and the micro lens, the apparatus 100 may be switched between the first light field camera mode and the second light field camera mode. That is, the apparatus 100 for image acquisition according to this embodiment of the present invention can be switched between the two light field camera modes.

Therefore, by controlling a focal length of a main lens, a focal length of a micro lens in a micro lens array, or focal lengths of the main lens and the micro lens, the apparatus for image acquisition according to this embodiment of the present invention enables the apparatus to be switched between a first light field camera mode and a second light field camera mode, which can implement switching between the two light field camera modes, thereby improving user experience.

Figure 2:
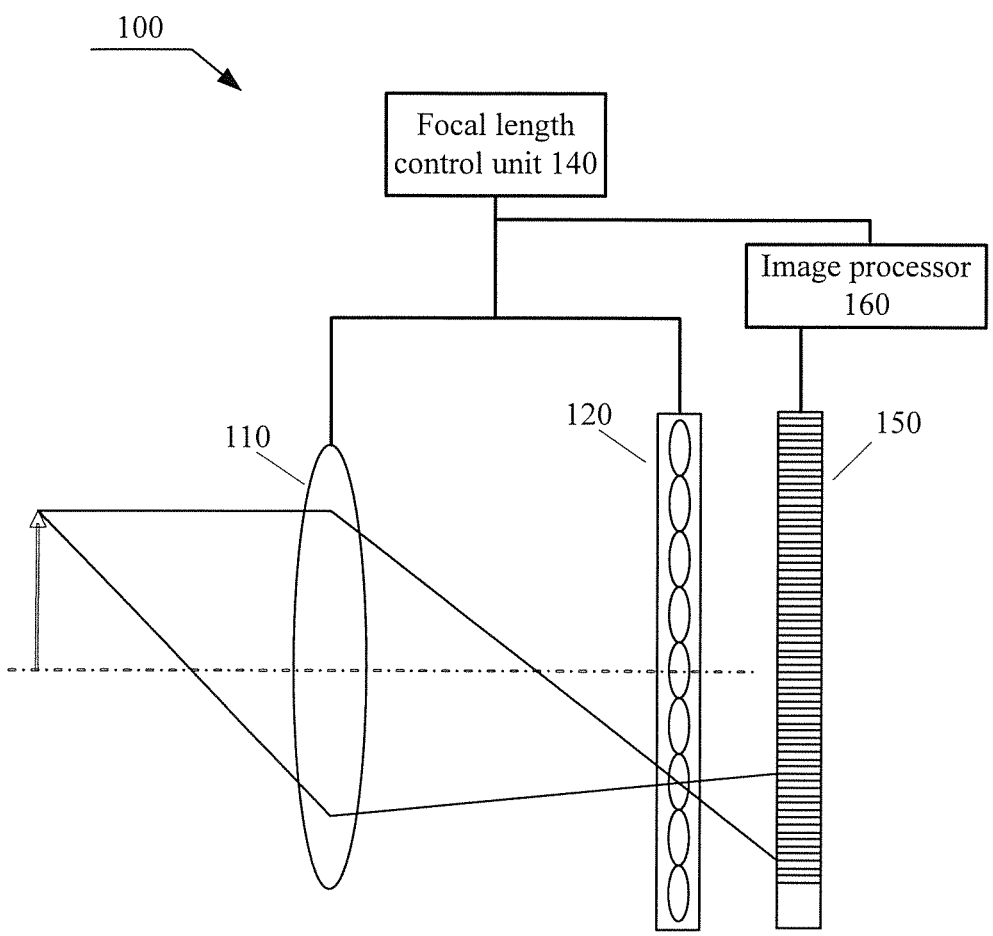
FIG. 2 is a schematic structural diagram of an apparatus for image acquisition according to another embodiment of the present invention.

In an embodiment of the present invention, optionally, as shown in FIG. 2, the apparatus 100 further includes:

an image processor 160, configured to process an electrical signal acquired by the image sensor 150, to form an image.

In this embodiment of the present invention, optionally, the focal length control unit 140 is a voltage-controlled focal length control unit, and the main lens 110 and the micro lens are voltage-controlled zoom lenses. That is, the focal length of the main lens 110 and the focal length of the micro lens in the micro lens array 120 are both changed in response to an imposed voltage. In this way, the focal length control unit 140 can change the focal lengths of the main lens 110 and the micro lens by controlling voltages imposed on the main lens 110 and the micro lens array 120.

In this embodiment of the present invention, optionally, the main lens 110 and the micro lens array 120 may use a liquid crystal lens, a Tlens, or a liquid lens. The main lens and the micro lens may use a same lens or may use different lenses.

The liquid crystal lens is, for example, an adjustable LensVector liquid crystal lens.

A principle of the Tlens is that: a piezoelectric element is embedded into a glass film, and there are a high molecular polymer and a glass support under the glass film. When a voltage on the piezoelectric element is zero, no applied force is imposed on the glass film, and a ray of light straightly passes through the glass film with no deflection. When there is a voltage on the piezoelectric element, an applied force is imposed on the glass film, causing distortion of the glass film and forming a lens. If the voltage is changed, a focal length of the lens is changed.

The liquid lens is also called a fluid lens. A basic principle of the liquid lens is that: the liquid lens includes two types of liquid that have different refractive indexes and are not mixed, where one type is conductive aqueous solution, and the other type is non-conductive silicone oil solution. The two types of liquid are sealed in a cylindrical vessel whose two sides are both transparent. Hydrophobicity processing has been performed on a vessel wall. Therefore, the aqueous solution gathers at a central part of the vessel in a domical shape, and a convex surface is formed between the aqueous solution and the silicone oil solution. A focal length of the liquid lens may be changed by changing a shape of the surface. A method for controlling the shape of the surface is that a vertical electric field is imposed on a hydrophobicity processing side, a position of a pressure balance point of the two types of liquid on the wall is controlled by using a feature that hydrophobicity of a coating weakens as the electric field weakens, and the shape of the surface is then changed by means of a change of surface tension of the two types of liquid, so that a shape of the lens can be controlled and a purpose of changing the focal length is achieved. For such a lens, a focal length is also controlled by using an electric field.

The following describes in detail how the apparatus 100 for image acquisition according to this embodiment of the present invention implements switching between the two light field camera modes and a common camera mode.

It is assumed that the focal length of the main lens 110 is $f_1$, and an aperture is $d_1$; the focal length of the micro lens in the micro lens array 120 is $f_2$, and an aperture is $d_2$; and a distance between the image sensor 150 and the micro lens array 120 is a, and a distance between the main lens 110 and the micro lens array 120 is b.

An F-number is a ratio of a focal length of a lens to an aperture of the lens. For the main lens, an F-number is $f_1/d_1$, and for the micro lens, an F-number is $f_2/d_2$.

F-number matching is that the F-number of the main lens is equal to that of the micro lens, that is, $f_1/d_1=f_2/d_2$.

A directional resolution of a light field camera not only depends on definition of a unit image, but also depends on a size of the unit image. There can be as many as pixels of an image sensor that are included in a unit image as possible. The F-number matching enables unit images to cover as many pixels of the image sensor as possible without interfering with each other.

Figure 3:
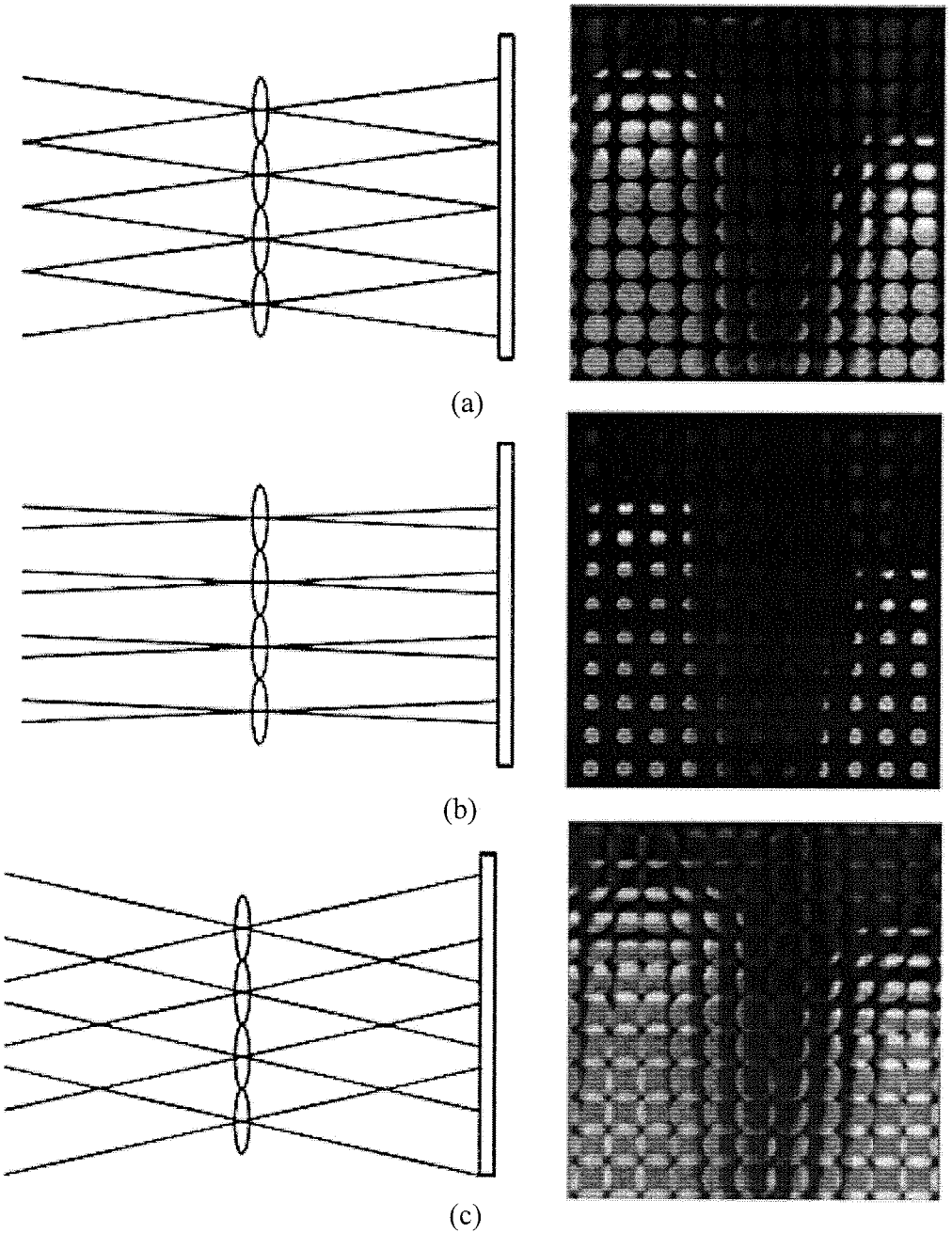
FIG. 3 is a schematic diagram of F-number matching.

As shown in FIG. 3, in (a), the F-numbers are matched, and the unit images can cover as many pixels of the image sensor as possible without interfering with each other; in (b), the F-number of the main lens is larger, a unit image on a back focal plane of the micro lens is not completely shown, a diameter of the unit image is less than a diameter of a unit lens, many pixels are black, and a waste of resolution is caused; and in (c), the F-number of the main lens is smaller, unit images below the micro lens mutually overlap and mutually interfere with a neighboring unit image, which is called crosstalk. Therefore, in a light field camera imaging mode, the F-number matching is needed, that is, $f_1/d_1=f_2/d_2$.

In this embodiment of the present invention, the first light field camera mode represents a light field camera 1.0 mode proposed by Stanford University, and the second light field camera mode represents a light field camera 2.0 mode proposed by Todor.

Figure 4:
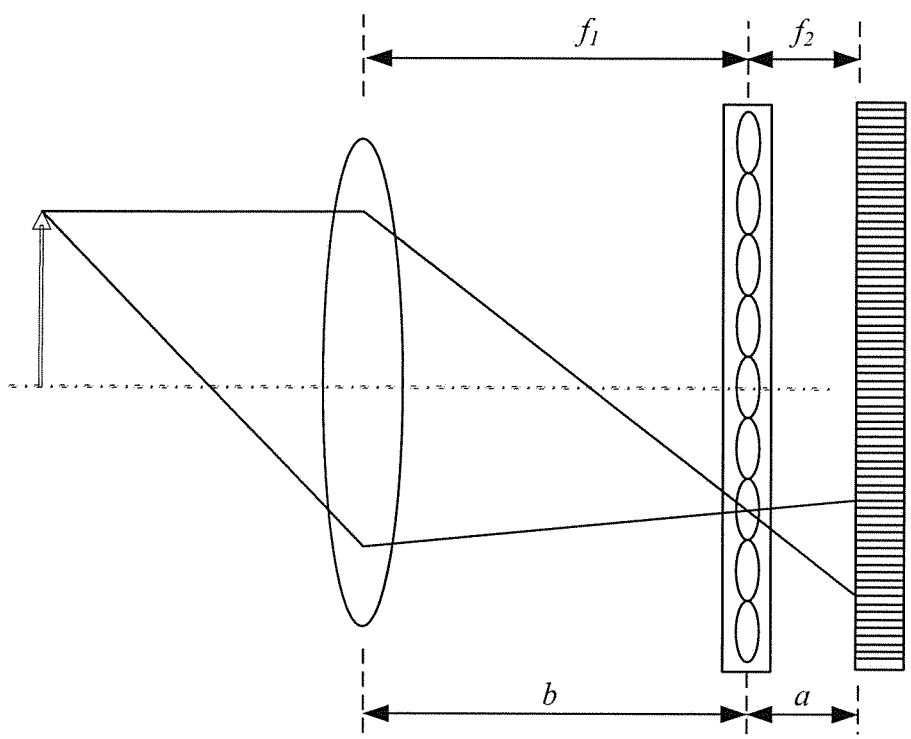
FIG. 4 is a schematic diagram of a first light field camera mode.

FIG. 4 is a schematic diagram of the first light field camera mode. In the first light field camera mode, $f_1/d_1=f_2/d_2$, $b=f_1$, and $a=f_2$.

Figure 5:
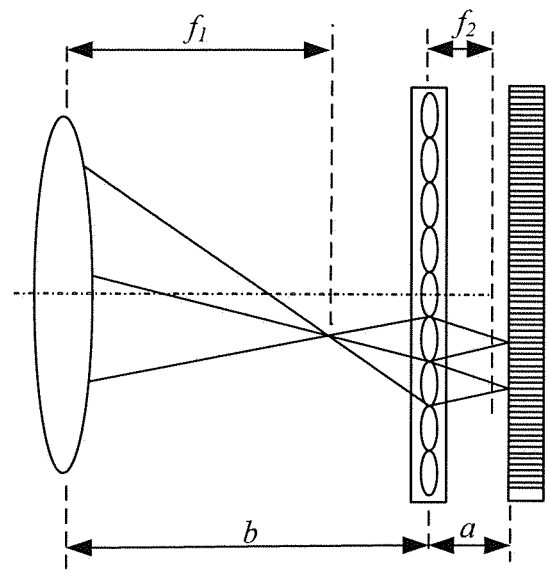
FIG. 5 is a schematic diagram of a second light field camera mode.

FIG. 5 is a schematic diagram of the second light field camera mode. In the second light field camera mode, $f_1/d_1=f_2/d_2$, $b>f_1$ or $b<f_1$, and $a>f_2$ or $a<f_2$. In addition, a Gaussian imaging formula $1/f_2=1/a+1/(b-f_1)$ needs to be satisfied, and therefore the following equations can be obtained:

$$f_1 = \frac{(d_1 a + d_2 a + d_2 b) \pm \sqrt{(d_1 a + d_2 a + d_s b)^2 - 4 d_1 d_2 a b}}{2 d_2}, \quad (1)$$

$$f_2 = \frac{(d_1 a + d_2 a + d_2 b) \pm \sqrt{(d_1 a + d_2 a + d_s b)^2 - 4 d_1 d_2 a b}}{2 d_1}, \quad (2)$$

Figure 6:
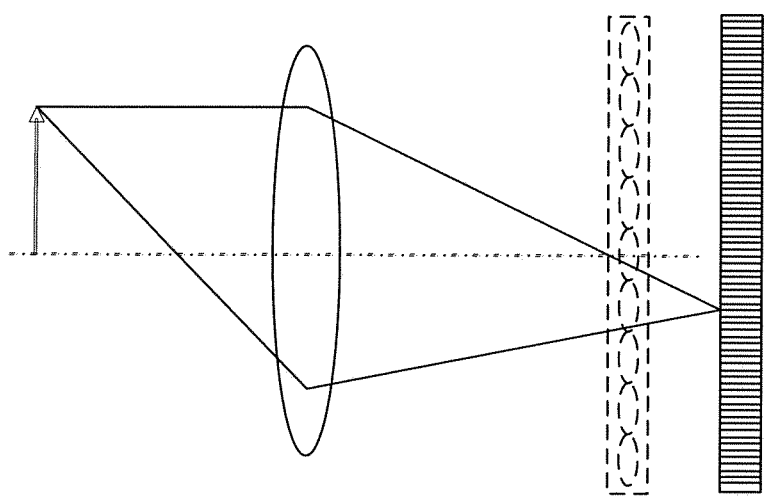
FIG. 6 is a schematic diagram of a common camera mode.

FIG. 6 is a schematic diagram of the common camera mode. In the common camera imaging mode, $f_2$ is infinite, that is, the micro lens array is equivalent to flat glass.

Therefore, the focal length of the main lens 110 and the focal length of the micro lens in the micro lens array 120 may be changed by controlling the voltages imposed on the main lens 110 and the micro lens array 120, so that the focal lengths satisfy a condition of the foregoing different imaging modes, to switch an imaging mode.

Optionally, in an embodiment of the present invention, the distance a between the micro lens array 120 and the image sensor and the distance b between the main lens 110 and the micro lens array 120 satisfy an equation $b/d_1=a/d_2$. That is, in this embodiment, a and b are fixed distances, and satisfy $b/d_1=a/d_2$.

Optionally, to enable the apparatus 100 to be in the first light field camera mode, the focal length control unit 140 controls the voltage imposed on the micro lens array 120, so that the focal length $f_2$ of the micro lens is equal to the distance a between the micro lens array 120 and the image sensor 150; and controls the voltage imposed on the main lens 110, so that the focal length $f_1$ of the main lens 110 is equal to the distance b between the main lens 110 and the micro lens array 120. In this case, $f_1/d_1=f_2/d_2$, $b=f_1$, $a=f_2$ are satisfied, and the apparatus 100 is in the first light field camera mode.

Optionally, to enable the apparatus 100 to be in the second light field camera mode, the focal length control unit 140 controls the voltage imposed on the main lens 110, so that the focal length $f_1$ of the main lens 110 satisfies equation (1); and controls the voltage imposed on the micro lens array 120, so that the focal length $f_2$ of the micro lens satisfies equation (2). In this case, a condition of the second light field camera mode is satisfied, and the apparatus 100 is in the second light field camera mode.

Optionally, to enable the apparatus 100 to be in the common camera mode, the focal length control unit 140 controls the voltage that is imposed on the micro lens array 120 to be zero, so that the focal length of the micro lens is infinite; and controls the voltage imposed on the main lens 110, to adjust the focal length of the main lens 110, so that the optical signal focuses on the image sensor 150. In this case, a condition of the common camera mode is satisfied, and the apparatus 100 is in the common camera mode.

Therefore, by controlling voltages imposed on a main lens and a micro lens array to change focal lengths of the main lens and a micro lens in the micro lens array, the apparatus for image acquisition according to this embodiment of the present invention can implement switching between two light field camera modes and a common camera mode, thereby improving user experience; and by fixing a distance between the micro lens array and an image sensor and a distance between the main lens and the micro lens array, the apparatus may not need a driving mechanism.

Optionally, as shown in FIG. 7, in another embodiment of the present invention, the apparatus 100 further includes:

a driver 170, where the driver 170 is directly or indirectly connected to the main lens 110 or to the micro lens array 120 and the image sensor 150, and is configured to drive the main lens 110, or drive the micro lens array 120 and the image sensor 150, to adjust the distance between the main lens 110 and the micro lens array 120.

In this embodiment, the distance b between the main lens 110 and the micro lens array 120 is adjustable. In this way, the imaging mode can be switched more flexibly.

Optionally, to enable the apparatus 100 to be in the first light field camera mode, the focal length control unit 140 controls the voltage imposed on the micro lens array 120, so that the focal length $f_2$ of the micro lens is equal to the distance a between the micro lens array 120 and the image sensor 150, and controls the voltage imposed on the main lens 110, so that the focal length $f_1$ of the main lens 110 satisfies the equation $f_1/d_1=f_2/d_2$. The driver 170 drives the main lens 110, or drives the micro lens array 120 and the image sensor 150, so that the distance b between the main lens 110 and the micro lens array 120 is equal to the focal length $f_1$ of the main lens 110. That is, a may be fixed first, and $f_2$ is adjusted, so that $f_2=a$; then, $f_1$ is adjusted, so that the equation $f_1/d_1=f_2/d_2$ is satisfied; finally, the driver 170 drives the main lens 110, or drives an overall structure of the micro lens array 120 and the image sensor 150, that is, b is adjusted, so that $b=f_1$; therefore, a condition of the first light field camera mode is satisfied. In this case, the apparatus 100 is in the first light field camera mode.

Optionally, to enable the apparatus 100 to be in the second light field camera mode, the focal length control unit 140 controls the voltage imposed on the main lens 110, so that the focal length $f_1$ of the main lens 110 satisfies equation (1); and controls the voltage imposed on the micro lens array 120, so that the focal length $f_2$ of the micro lens satisfies equation (2). In this implementation manner, a and b are not strictly limited, that is, a and b may be preset values. By adjusting $f_1$ and $f_2$, a and b satisfy equation (1) and equation (2) respectively, so that the apparatus 100 is in the second light field camera mode.

Optionally, if the apparatus 100 is originally in the first light field camera mode, when the apparatus 100 is switched to the second light field camera mode, the driver 170 may first drive the main lens 110 or drive the micro lens array 120 and the image sensor 150, to change the distance b between the main lens 110 and the micro lens array 120; then, the focal length control unit 140 further controls the voltage imposed on the main lens 110, so that the focal length $f_1$ of the main lens satisfies equation (1); and controls the voltage imposed on the micro lens array 120, so that the focal length $f_2$ of the micro lens satisfies equation (2). In this implementation manner, b is also not strictly limited, that is, b may be a preset value.

Optionally, to enable the apparatus 100 to be in the common camera mode, the focal length control unit 140 controls the voltage that is imposed on the micro lens array 120 to be zero, so that the focal length of the micro lens is infinite; and controls the voltage imposed on the main lens 110, to adjust the focal length of the main lens 110, so that the optical signal focuses on the image sensor 150. In this case, the condition of the common camera mode is satisfied, and the apparatus 100 is in the common camera mode.

Therefore, by controlling voltages imposed on a main lens and a micro lens array to change focal lengths of the main lens and a micro lens in the micro lens array, and by using a driver to adjust a distance between the main lens and the micro lens array, the apparatus for image acquisition according to this embodiment of the present invention can flexibly implement switching between two light field camera modes and a common camera mode, thereby improving user experience.

In this embodiment of the present invention, optionally, the image sensor 150 may be a charge coupled device (CCD), or a complementary metal oxide semiconductor (CMOS) device.

In this embodiment of the present invention, the image processor 160 is configured to process an electrical acquired by the image sensor 150, to form an image.

In the first light field camera mode and the second light field camera mode, the image sensor 160 performs a refocusing calculation on the electrical signal acquired by the image sensor 150, to form an image that is finally needed. In the common camera mode, no refocusing calculation needs to be performed on the electrical signal acquired by the image sensor 150, and the image is directly formed.

The foregoing describes in detail an apparatus for image acquisition according to an embodiment of the present invention, and the following describes a method for image acquisition according to an embodiment of the present invention.

FIG. 8 shows a schematic flowchart of a method 800 for image acquisition by an apparatus for image acquisition according to an embodiment of the present invention. The apparatus is an apparatus 100 for image acquisition according to an embodiment of the present invention. As shown in FIG. 8, the method 800 includes:

S810. A focal length control unit controls a focal length of a main lens, a focal length of a micro lens in a micro lens array, or focal lengths of the main lens and the micro lens, so that the apparatus is switched between a first light field camera mode and a second light field camera mode.

S820. An image sensor senses an optical signal that is transmitted from the main lens and the micro lens array, and converts the optical signal into an electrical signal, to acquire an image.

In this embodiment of the present invention, the focal length of the main lens and the focal length of the micro lens in the micro lens array may be both changed under control of the focal length control unit. Therefore, by controlling the focal length of the main lens, the focal length of the micro lens, or the focal lengths of the main lens and the micro lens, the apparatus may be switched between the first light field camera mode and the second light field camera mode, so that an image can be acquired in a different camera mode.

Therefore, by controlling a focal length of a main lens of an apparatus for image acquisition, a focal length of a micro lens in a micro lens array of the apparatus for image acquisition, or focal lengths of the main lens and the micro lens of the apparatus for image acquisition, the method for image acquisition according to this embodiment of the present invention enables the apparatus to be switched between a first light field camera mode and a second light field camera mode, which can implement switching between the two light field camera modes, thereby improving user experience.

In this embodiment of the present invention, optionally, the method 800 further includes:

processing, by an image processor, an electrical signal acquired by the image sensor, to form an image.

In this embodiment of the present invention, optionally, the focal length control unit is a voltage-controlled focal length control unit, and the main lens and the micro lens are voltage-controlled zoom lenses; and the controlling, by the focal length control unit, a focal length of a main lens, a focal length of a micro lens in a micro lens array, or focal lengths of the main lens and the micro lens includes:

controlling, by the focal length control unit, a voltage imposed on the main lens, a voltage imposed on the micro lens array, or voltages imposed on the main lens and the micro lens array, to control the focal length of the main lens, the focal length of the micro lens, or the focal lengths of the main lens and the micro lens.

Optionally, in an embodiment of the present invention, a distance a between the micro lens array and the image sensor and a distance b between the main lens and the micro lens array satisfy an equation $b/d_1 = a/d_2$. That is, in this embodiment, a and b are fixed distances, and satisfy $b/d_1 = a/d_2$.

In this situation, to enable the apparatus to be in the first light field camera mode, the focal length control unit controls the voltage imposed on the micro lens array, so that the focal length $f_2$ of the micro lens is equal to the distance a between the micro lens array and the image sensor; and the focal length control unit controls the voltage imposed on the main lens, so that the focal length $f_1$ of the main lens is equal to the distance b between the main lens and the micro lens array.

To enable the apparatus to be in the second light field camera mode, the focal length control unit controls the voltage imposed on the main lens, so that the focal length $f_1$ of the main lens satisfies equation (1); and the focal length control unit controls the voltage imposed on the micro lens array, so that the focal length $f_2$ of the micro lens satisfies equation (2).

To enable the apparatus to be in a common camera mode, the focal length control unit controls the voltage that is imposed on the micro lens array to be zero, so that the focal length of the micro lens is infinite; and the focal length control unit controls the voltage imposed on the main lens, to adjust the focal length of the main lens, so that the optical signal focuses on the image sensor.

Therefore, by controlling voltages imposed on a main lens and a micro lens array to change focal lengths of the main lens and a micro lens in the micro lens array, the method for image acquisition according to this embodiment of the present invention can implement switching between two light field camera modes and a common camera mode, thereby improving user experience.

Figure 9:
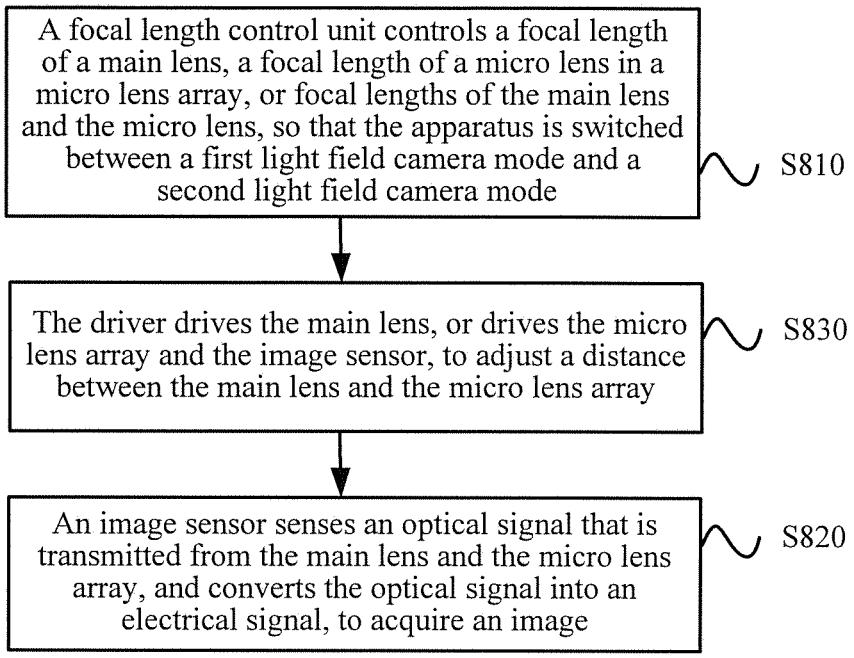
FIG. 9 is a schematic flowchart of a method for image acquisition according to another embodiment of the present invention.

Optionally, as shown in FIG. 9, in another embodiment of the present invention, when the apparatus for image acquisition includes a driver, the method 800 further includes:

S830. The driver drives the main lens, or drives the micro lens array and the image sensor, to adjust a distance between the main lens and the micro lens array.

Specifically, to enable the apparatus to be in the first light field camera mode, the focal length control unit controls the voltage imposed on the micro lens array, so that the focal length $f_2$ of the micro lens is equal to a distance a between the micro lens array and the image sensor;

the focal length control unit controls the voltage imposed on the main lens, so that the focal length $f_1$ of the main lens satisfies an equation $f_1/d_1 = f_2/d_2$; and the driver drives the main lens, or drives the micro lens array and the image sensor, so that the distance b between the main lens and the micro lens array is equal to the focal length $f_1$ of the main lens.

To enable the apparatus to be in the second light field camera mode, the focal length control unit controls the voltage imposed on the main lens, so that the focal length $f_1$ of the main lens satisfies equation (1); and the focal length control unit controls the voltage imposed on the micro lens array, so that the focal length $f_2$ of the micro lens satisfies equation (2).

Optionally, if the apparatus is originally in the first light field camera mode, when the apparatus is switched to the second light field camera mode, the driver may first drive the main lens or drive the micro lens array and the image sensor, to change the distance b between the main lens and the micro lens array;

then, the focal length control unit controls the voltage imposed on the main lens, so that the focal length $f_1$ of the main lens satisfies equation (1); and the focal length control unit controls the voltage imposed on the micro lens array, so that the focal length $f_2$ of the micro lens satisfies equation (2).

To enable the apparatus to be in the common camera mode, the focal length control unit controls the voltage that is imposed on the micro lens array to be zero, so that the focal length of the micro lens is infinite; and the focal length control unit controls the voltage imposed on the main lens, to adjust the focal length of the main lens, so that the optical signal focuses on the image sensor, so that the apparatus is in the common camera mode.

Therefore, by controlling voltages imposed on a main lens and a micro lens array to change focal lengths of the main lens and a micro lens in the micro lens array, and by using a driver to adjust a distance between the main lens and the micro lens array, the method for image acquisition according to this embodiment of the present invention can flexibly implement switching between two light field camera modes and a common camera mode, thereby improving user experience.

Each procedure of the method 800 for image acquisition according to this embodiment of the present invention may be executed and implemented by a corresponding component in an apparatus 100 for image acquisition according to an embodiment of the present invention. For brevity, details are not described herein again.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 10:
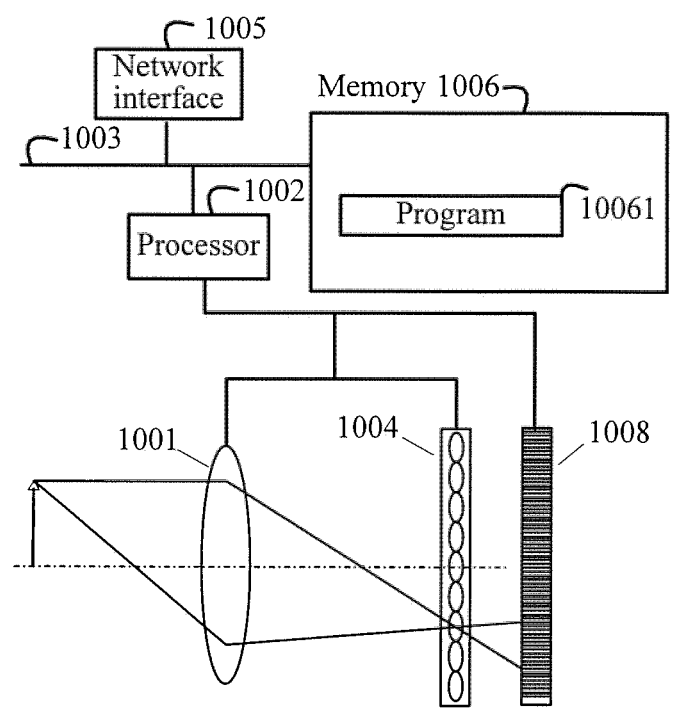
FIG. 10 is a schematic structural diagram of an apparatus for image acquisition according to still another embodiment of the present invention.

FIG. 10 shows a structure of an apparatus for image acquisition provided in another embodiment of the present invention, including a main lens 1001, a micro lens array 1004, an image sensor 1008, at least one processor 1002 (such as a CPU), at least one network interface 1005 or another communications interface, a memory 1006, and at least one communications bus 1003. The communications bus 1003 is configured to implement connection and communication between these components. The main lens 1001, the micro lens array 1004, and the image sensor 1008 are successively disposed alternately. The processor 1002 is configured to execute an executable module stored in the memory 1006, such as a computer program. The memory 1006 may include a high-speed random access memory (RAM: Random Access Memory), and may further include a non-volatile memory (non-volatile memory), such as at least one magnetic disk memory.

In some implementation manners, the memory 1006 stores a program 10061, and the processor 1002 executes the program 10061 to:

control a focal length of the main lens, a focal length of a micro lens in the micro lens array, or focal lengths of the main lens and the micro lens, so that the apparatus is switched between a first light field camera mode and a second light field camera mode; and control the image sensor to sense an optical signal that is transmitted from the main lens and the micro lens array, and convert the optical signal into an electrical signal, to acquire an image.

Optionally, the processor 1002 is further configured to process the electrical signal acquired by the image sensor, to form the image.

Optionally, the main lens and the micro lens are voltage-controlled zoom lens; and the processor 1002 is specifically configured to control a voltage imposed on the main lens, a voltage imposed on the micro lens array, or voltages imposed on the main lens and the micro lens array, to control the focal length of the main lens, the focal length of the micro lens, or the focal lengths of the main lens and the micro lens.

Optionally, a distance a between the micro lens array and the image sensor and a distance b between the main lens and the micro lens array satisfy an equation $b/d_1 = a/d_2$, where $d_1$ is an aperture of the main lens, and $d_2$ is an aperture of the micro lens.

Optionally, the processor 1002 is specifically configured to: control the voltage imposed on the micro lens array, so that the focal length $f_2$ of the micro lens is equal to the distance a between the micro lens array and the image sensor; and control the voltage imposed on the main lens, so that the focal length $f_1$ of the main lens is equal to the distance b between the main lens and the micro lens array, so that the apparatus is in the first light field camera mode.

Optionally, the processor 1002 is specifically configured to: control the voltage imposed on the main lens, so that the focal length $f_1$ of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2};$$

and control the voltage imposed on the micro lens array, so that the focal length $f_2$ of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode.

Optionally, the apparatus further includes a driver; and the processor 1002 is further configured to control the driver to drive the main lens, or drive the micro lens array and the image sensor, to adjust the distance between the main lens and the micro lens array.

Optionally, the processor 1002 is specifically configured to: control the voltage imposed on the micro lens array, so that the focal length $f_2$ of the micro lens is equal to the distance a between the micro lens array and the image sensor;

control the voltage imposed on the main lens, so that the focal length $f_1$ of the main lens satisfies an equation $f_1/d_1 = f_2/d_2$, where $d_1$ is the aperture of the main lens, and $d_2$ is the aperture of the micro lens; and control the driver to drive the main lens, or drive the micro lens array and the image sensor, so that the distance b between the main lens and the micro lens array is equal to the focal length $f_1$ of the main lens, so that the apparatus is in the first light field camera mode.

Optionally, the processor 1002 is specifically configured to: control the voltage imposed on the main lens, so that the focal length $f_1$ of the main lens satisfies the equation $$f_1 = \frac{(d_1 a + d_2 a + d_2 b) \pm \sqrt{(d_1 a + d_2 a + d_2 b)^2 - 4 d_1 d_2 ab}}{2 d_1},$$

and control the voltage imposed on the micro lens array, so that the focal length $f_2$ of the micro lens satisfies the equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode, where a is the distance between the micro lens array and the image sensor, b is the distance between the main lens and the micro lens array, $d_1$ is the aperture of the main lens, and $d_2$ is the aperture of the micro lens.

Optionally, the processor 1002 is specifically configured to: control the driver to drive the main lens, or drive the micro lens array and the image sensor, to change the distance b between the main lens and the micro lens array;

control the voltage imposed on the main lens, so that the focal length $f_1$ of the main lens satisfies the equation $$f_1 = \frac{(d_1 a + d_2 a + d_2 b) \pm \sqrt{(d_1 a + d_2 a + d_2 b)^2 - 4 d_1 d_2 ab}}{2 d_2};$$

and control the voltage imposed on the micro lens array, so that the focal length $f_2$ of the micro lens satisfies the equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode.

Optionally, the processor 1002 is specifically configured to: control the voltage that is imposed on the micro lens array to be zero, so that the focal length of the micro lens is infinite; and control the voltage imposed on the main lens, to adjust the focal length of the main lens, so that the optical signal focuses on the image sensor, so that the apparatus is in the common camera mode.

It can be seen from the foregoing technical solutions provided in this embodiment of the present invention that, by controlling a focal length of a main lens of an apparatus for image acquisition, a focal length of a micro lens in a micro lens array of the apparatus for image acquisition, or focal lengths of the main lens and the micro lens of the apparatus for image acquisition, this embodiment of the present invention enables the apparatus to be switched between a first light field camera mode and a second light field camera mode, which can implement switching between the two light field camera modes, thereby improving user experience.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for ease and brevity of description, for a corresponding process in the foregoing method embodiments, reference may be made to a detailed working process of the apparatus and the units that are described in the foregoing apparatus embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for image acquisition, the apparatus comprising:
a main lens, a micro lens array, and an image sensor successively disposed alternately, and wherein the image sensor is configured to: sense an optical signal transmitted from the main lens and the micro lens array, and convert the optical signal into an electrical signal; and
a processor configured to:
control a focal length '$f_1$' of the main lens, a focal length '$f_2$' of a micro lens in the micro lens array, or the focal length '$f_1$' of the main lens and the focal length '$f_2$' of the micro lens, to switch the apparatus between a first light field camera mode and a second light field camera mode;

wherein:
the processor is generates a voltage to control the focal length '$f_1$', the focal length '$f_2$', or the focal length '$f_1$' of the main lens and the focal length '$f_2$' of the micro lens;
the main lens and the micro lens are voltage-controlled zoom lenses; and
the processor is configured to change the focal lengths of the main lens and the micro lens by controlling voltages imposed on the main lens and the micro lens array;
wherein a distance 'a' between the micro lens array and the image sensor and a distance 'b' between the micro lens array and the main lens satisfy an equation $b/d_1 = a/d_2$, wherein '$d_1$' is an aperture of the main lens, and '$d_2$' is an aperture of the micro lens.

2. The apparatus according to claim 1, wherein the processor is configured to:
control the voltage imposed on the micro lens array, so that the focal length '$f_2$' of the micro lens is equal to the distance 'a' between the micro lens array and the image sensor; and
control the voltage imposed on the main lens, so that the focal length '$f_1$' of the main lens is equal to the distance 'b' between the main lens and the micro lens array, so that the apparatus is in the first light field camera mode.

3. The apparatus according to claim 1, wherein the processor is configured to:
control the voltage imposed on the main lens, so that the focal length '$f_1$' of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2};$$

and
control the voltage imposed on the micro lens array, so that the focal length '$f_2$' of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode.

4. The apparatus according to claim 1, wherein the apparatus further comprises:
a driver directly or indirectly connected to the main lens or to the micro lens array and the image sensor and configured to drive the main lens, or drive the micro lens array and the image sensor, to adjust a distance between the main lens and the micro lens array.

5. The apparatus according to claim 4, wherein:
the processor is configured to:
control the voltage imposed on the micro lens array, so that the focal length '$f_2$' of the micro lens is equal to a distance 'a' between the micro lens array and the image sensor, and
control the voltage imposed on the main lens, so that the focal length '$f_1$' of the main lens satisfies an equation $f_1/d_1 = f_2/d_2$; and
the driver is configured to:
drive the main lens, or drive the micro lens array and the image sensor, so that the distance 'b' between the main lens and the micro lens array is equal to the focal length '$f_1$' of the main lens, so that the apparatus is in the first light field camera mode, wherein '$d_1$' is an aperture of the main lens, and '$d_2$' is an aperture of the micro lens.

6. The apparatus according to claim 4, wherein the processor is configured to:
control the voltage imposed on the main lens, so that the focal length '$f_1$' of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2};$$

and
control the voltage imposed on the micro lens array, so that the focal length '$f_2$' of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode, wherein 'a' is a distance between the micro lens array and the image sensor, 'b' is the distance between the main lens and the micro lens array, '$d_1$' is an aperture of the main lens, and '$d_2$' is an aperture of the micro lens.

7. The apparatus according to claim 5, wherein:
the driver is configured to: drive the main lens, or drive the micro lens array and the image sensor, to change the distance 'b' between the main lens and the micro lens array; and
the processor is configured to: control the voltage imposed on the main lens, so that the focal length '$f_1$' of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2},$$

and control the voltage imposed on the micro lens array, so that the focal length '$f_2$' of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode.

8. The apparatus according to claim 1, wherein the processor is configured to:
control the voltage that is imposed on the micro lens array to be zero, so that the focal length of the micro lens is infinite; and
control the voltage imposed on the main lens, to adjust the focal length of the main lens, so that the optical signal focuses on the image sensor, so that the apparatus is in a common camera mode.

9. The apparatus according to claim 1, wherein:
in the first light field camera mode, $f_1/d_1 = f_2/d_2$, $b = f_1$, and $a = f_2$.

10. The apparatus according to claim 9, wherein:
in the second light field camera mode, $f_1/d_1 = f_2/d_2$, $b > f_1$, or $b < f_1$, and $a > f_2$ or $a < f_2$.

11. A method for image acquisition for use with an apparatus comprising a main lens, a micro lens array, a processor, and an image sensor, wherein the main lens, the micro lens array, and the image sensor are successively disposed alternately, the method comprising:
controlling, by the processor, a focal length '$f_1$' of the main lens, a focal length '$f_2$' of a micro lens in the micro lens array, or the focal length '$f_1$' of the main lens and the focal length '$f_2$' of the micro lens, so that the apparatus is switched between a first light field camera mode and a second light field camera mode; and
sensing, by the image sensor, an optical signal transmitted from the main lens and the micro lens array, and converting the optical signal into an electrical signal, to acquire an image;
wherein, the processor is generates a voltage to control the focal length '$f_1$', the focal length '$f_2$', or the focal length '$f_1$' of the main lens and the focal length '$f_2$' of the micro lens; the main lens and the micro lens are voltage-controlled zoom lenses; and
controlling, by the processor, a focal length of the main lens, a focal length of a micro lens in the micro lens array, or focal lengths of the main lens and the micro lens comprises:
controlling, by the processor, a voltage imposed on the main lens, a voltage imposed on the micro lens array, or voltages imposed on the main lens and the micro lens array, to control the focal length of the main lens, the focal length of the micro lens, or the focal lengths of the main lens and the micro lens;
wherein a distance 'a' between the micro lens array and the image sensor and a distance 'b' between the micro lens array and the main lens satisfy an equation $b/d_1 = a/d_2$, wherein '$d_1$' is an aperture of the main lens, and '$d_2$' is an aperture of the micro lens.

12. The method according to claim 11, wherein controlling, by the processor, a focal length of the main lens, a focal length of a micro lens in the micro lens array, or focal lengths of the main lens and the micro lens comprises:
controlling, by the processor, the voltage imposed on the micro lens array, so that the focal length '$f_2$' of the micro lens is equal to the distance 'a' between the micro lens array and the image sensor; and
controlling, by the processor, the voltage imposed on the main lens, so that the focal length '$f_1$' of the main lens is equal to the distance 'b' between the main lens and the micro lens array, so that the apparatus is in the first light field camera mode.

13. The method according to claim 11, wherein controlling, by the processor, a focal length of the main lens, a focal length of a micro lens in the micro lens array, or focal lengths of the main lens and the micro lens comprises:
controlling, by the processor, the voltage imposed on the main lens, so that the focal length '$f_1$' of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2};$$

and
controlling, by the processor, the voltage imposed on the micro lens array, so that the focal length '$f_2$' of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode.

14. The method according to claim 11, wherein:

the apparatus further comprises a driver directly or indirectly connected to the main lens or to the micro lens array and the image sensor; and the method further comprises:

driving, by the driver, the main lens, or driving the micro lens array and the image sensor, to adjust a distance between the main lens and the micro lens array.

15. The method according to claim 14, wherein:

controlling, by the processor, a focal length of the main lens, a focal length of a micro lens in the micro lens array, or focal lengths of the main lens and the micro lens comprises:

controlling, by the processor, the voltage imposed on the micro lens array, so that the focal length '$f_2$' of the micro lens is equal to a distance a between the micro lens array and the image sensor, controlling, by the processor, the voltage imposed on the main lens, so that the focal length '$f_1$' of the main lens satisfies an equation $f/d_1 = f_2/d_2$, wherein '$d_1$' is an aperture of the main lens, and '$d_2$' is an aperture of the micro lens; and driving, by the driver, the main lens, or driving the micro lens array and the image sensor comprises:

driving, by the driver, the main lens, or driving the micro lens array and the image sensor, so that the distance 'b' between the main lens and the micro lens array is equal to the focal length '$f_1$' of the main lens, so that the apparatus is in the first light field camera mode.

16. The method according to claim 14, wherein controlling, by the processor, a focal length of the main lens, a focal length of a micro lens in the micro lens array, or focal lengths of the main lens and the micro lens comprises:

controlling, by the processor, the voltage imposed on the main lens, so that the focal length '$f_1$' of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2};$$

and controlling, by the processor, the voltage imposed on the micro lens array, so that the focal length '$f_2$' of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode, wherein 'a' is a distance between the micro lens array and the image sensor, 'b' is the distance between the main lens and the micro lens array, '$d_1$' is an aperture of the main lens, and '$d_2$' is an aperture of the micro lens.

17. The method according to claim 15, wherein:

driving, by the driver, the main lens, or driving the micro lens array and the image sensor further comprises:

driving, by the driver, the main lens, or driving the micro lens array and the image sensor, to change the distance 'b' between the main lens and the micro lens array; and controlling, by the processor, a focal length of the main lens, a focal length of a micro lens in the micro lens array, or focal lengths of the main lens and the micro lens further comprises:

controlling, by the processor, the voltage imposed on the main lens, so that the focal length '$f_1$' of the main lens satisfies an equation $$f_1 = \frac{(d_1 a + d_2 a + d_2 b) \pm \sqrt{(d_1 a + d_2 a + d_2 b)^2 - 4 d_1 d_2 ab}}{2 d_2},$$

and controlling, by the processor, the voltage imposed on the micro lens array, so that the focal length '$f_2$' of the micro lens satisfies an equation $$f_2 = \frac{(d_1 a + d_2 a + d_2 b) \pm \sqrt{(d_1 a + d_2 a + d_2 b)^2 - 4 d_1 d_2 ab}}{2 d_1},$$

so that the apparatus is in the second light field camera mode.

18. The method according to claim 11, wherein controlling, by the processor, a focal length of the main lens, a focal length of a micro lens in the micro lens array, or focal lengths of the main lens and the micro lens comprises:

controlling, by the processor, the voltage that is imposed on the micro lens array to be zero, so that the focal length of the micro lens is infinite; and controlling, by the processor, the voltage imposed on the main lens, to adjust the focal length of the main lens, so that the optical signal focuses on the image sensor, so that the apparatus is in a common camera mode.

19. The method according to claim 11, wherein:

in the first light field camera mode, $f_1/d_1 = f_2/d_2$, $b = f_1$, and $a = f_2$.

20. The method according to claim 19, wherein:

in the second light field camera mode, $f_1/d_1 = f_2/d_2$, $b > f_1$ or $b < f_1$, and $a > f_2$ or $a < f_2$.

* * * * *